(12) United States Patent
Heizmann et al.

(10) Patent No.: US 6,292,235 B1
(45) Date of Patent: Sep. 18, 2001

(54) DISTORTION CORRECTION SYSTEM WITH SWITCHABLE DIGITAL FILTER

(75) Inventors: Friedrich Heizmann, Villingen (DE); John Barrett George, Carmel, IN (US); Gunter Gleim; Albert Runtze, both of Villingen (DE)

(73) Assignee: Thomson Licensing S.A., Boulogne, Cedex (FR)

( * ) Notice: Subject to any disclaimer, the term of this patent is extended or adjusted under 35 U.S.C. 154(b) by 0 days.

(21) Appl. No.: 09/408,359

(22) Filed: Sep. 29, 1999

(51) Int. Cl.$^7$ .................................................. H04N 3/22
(52) U.S. Cl. .................. 348/806; 348/745; 348/746; 315/368.11; 315/368.13
(58) Field of Search .................... 348/745, 746, 348/747, 806, 807; 315/368.11, 368.13, 368.15, 368.18

(56) References Cited

U.S. PATENT DOCUMENTS

| | | | |
|---|---|---|---|
| 5,072,200 | * 12/1991 | Ranky | 333/167 |
| 5,353,026 | * 10/1994 | Wilson | 341/143 |
| 5,506,481 | * 4/1996 | Wada et al. | 348/806 |
| 5,592,240 | * 1/1997 | Sakamoto et al. | 348/806 |
| 5,734,233 | * 3/1998 | Masumoto et al. | 348/807 |
| 5,751,122 | * 5/1998 | Park | 348/807 |
| 6,002,454 | * 12/1999 | Kajiwara et al. | 348/806 |
| 6,014,168 | * 1/2000 | Webb et al. | 348/806 |

* cited by examiner

Primary Examiner—Reinhard J. Eisenzopf
Assistant Examiner—Trang U. Tran
(74) Attorney, Agent, or Firm—Joseph S. Tripoli; Joseph J. Laks; Harvey D. Fried

(57) ABSTRACT

A switchable digital filter interpolates distortion correction values. The distortion correction values together with interpolated distortion correction values are supplied as an output. Proper operation of the digital filter is disturbed by transient signals occurring during horizontal retrace. The digital output is converted to an analog convergence correction signal. The digital to analog converter has an operating frequency and generates a transient signal during horizontal retrace as the operating frequency increases due to an increased horizontal scanning rate. A low pass filter receives the analog convergence correction signal and generates an analog deflection signal. An auxiliary deflection coil is driven by the analog deflection signal. The digital filter is switched off during the horizontal retrace. The digital filter is thus protected from disturbance by the transient signal and the digital to analog converter is protected from exceeding a maximum operating frequency.

6 Claims, 6 Drawing Sheets

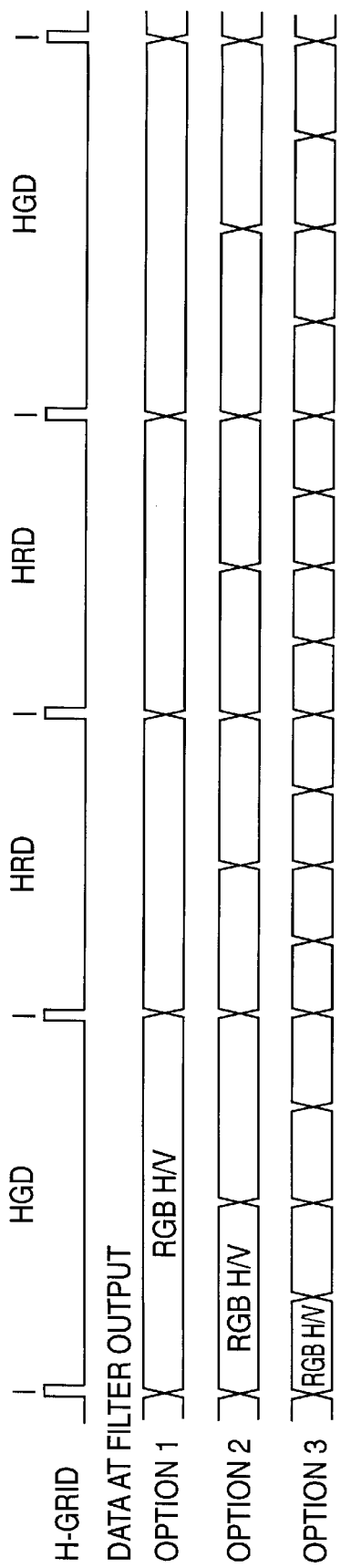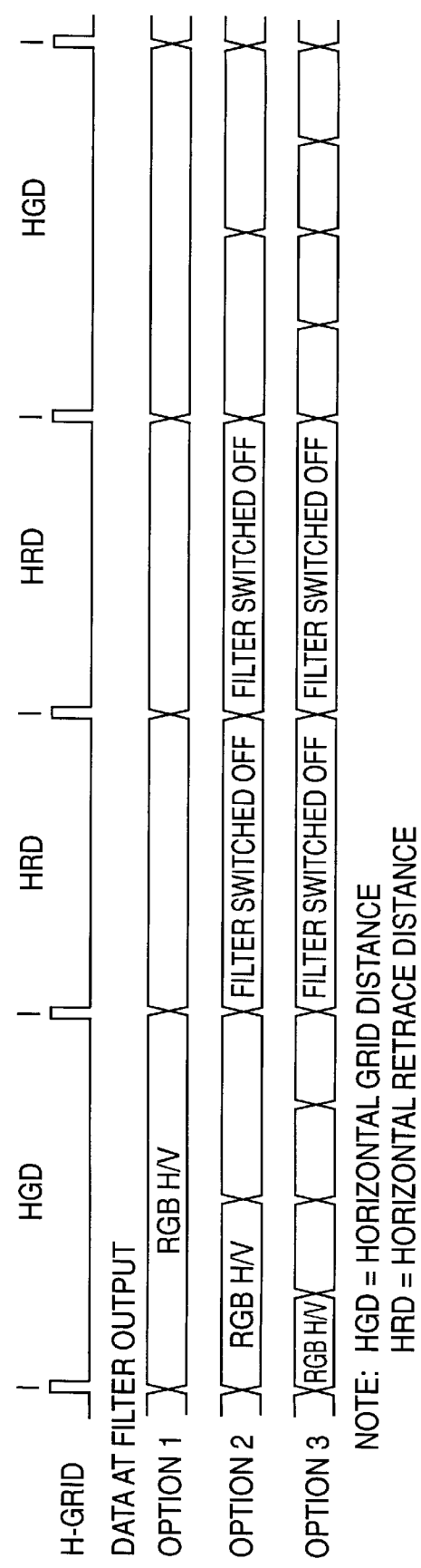

DISTORTION CORRECTION SYSTEM WITH SWITCHABLE DIGITAL FILTER

BACKGROUND OF THE INVENTION

This invention relates to the field of raster distortion correction systems with switchable digital interpolating filters.

Raster distortion correction, for example convergence and pincushion correction, is an important aspect of television performance, particularly for large direct view and projection television receivers and monitors. Projection television receivers can present a very difficult challenge to distortion correction systems due to the off-axis orientation of two of the three projection tubes and due to the need to provide separate distortion control systems for each projection tube. In projection television receivers, the green tube is usually in a central orientation. After the raster of the green tube is corrected, the rasters generated by the red and blue tubes must be corrected and converged to match the raster generated by the green tube.

Generally, distortion correction data can be stored in a digital memory, read out of memory, processed by an interpolator to provide additional correction data, converted to analog form, analog low-pass filtered and amplified for use as a convergence correction deflection signal. Each distortion correction circuit must be optimized not only for each projection tube's internal geometry and mounting orientation, as well as the screen size and screen orientation, but for the horizontal scanning frequency of the input video signal as well. The analog low-pass filter, which can form an input for a preamplifier, is a part of the circuit that can be most sensitive to differences in horizontal scanning frequency. Moreover, many receivers presenting significant distortion correction challenges are already adapted to operate at the standard horizontal scanning frequency (1fH) and twice the standard horizontal scanning frequency (2fH). In fact, such receivers will also need to process video signals having a horizontal scanning frequency three times (3fH) the standard frequency.

If the distortion correction system operates with high horizontal frequency (for example 2fH or 3fH, or more) and very short retrace times, the frequency of the digital filter, and thus also the frequency of the D/A converters, is very high during horizontal retrace. This can lead to exceeding the permissible maximum frequency of the D/A converters. It is desirable to prevent exceeding the permissible maximum frequency.

Digital filters, particularly finite impulse response (FIR) filters, are sensitive to noise and signal transients that occur during horizontal retrace because FIR filters rely on earlier samples to generate output values. Even if the maximum frequency of the D/A converters is not exceeded, operation of the D/A converters at high scanning frequencies can cause large transient signals that can disturb proper operation of the digital filter at the beginning of horizontal trace. It is desirable to prevent the digital filters from disturbance due to transient signals occurring during horizontal retrace.

SUMMARY OF THE INVENTION

A distortion correction system in accordance with inventive arrangements comprises: a switchable digital filter for interpolating distortion correction values, said distortion correction values together with interpolated distortion correction values being supplied as an output, proper operation of said digital filter being disturbed by transient signals occurring near the beginning of horizontal trace; a digital to analog converter for converting said supplied output to an analog convergence correction signal, said digital to analog converter having an operating frequency and generating a transient signal during horizontal retrace as said operating frequency increases due to an increased horizontal scanning rate; a low pass filter coupled for receiving said analog convergence correction signal and generating an analog deflection signal; an auxiliary deflection coil driven by said analog deflection signal; and, means for switching said digital filter off during said horizontal retrace, whereby said digital filter is protected from disturbance by said transient signal and said digital to analog converter is protected from exceeding a maximum operating frequency.

A method for distortion correction in accordance with inventive arrangements comprises the steps of: digitally filtering distortion correction values for generating interpolated distortion correction values, proper operation of said digital filter being disturbed by transient signals occurring near the beginning of horizontal trace; supplying said distortion correction values together with interpolated distortion correction values as an output; converting said supplied output to an analog convergence correction signal at an operating frequency, said converting step generating a transient signal during horizontal retrace as said operating frequency increases due to an increased horizontal scanning rate; low pass filtering said analog convergence correction signal and generating an analog deflection signal; driving an auxiliary deflection coil with said analog deflection signal; and, inhibiting said supplying step during said horizontal retrace, whereby said digitally filtering step is protected from disturbance by said transient signal and said converting step is protected from exceeding a maximum operating frequency.

In accordance with inventive arrangements, the digital filter can be advantageously switched off during horizontal retrace. Switching off the filters during the horizontal retrace advantageously prevents the transient signal from occurring and can advantageously prevent exceeding the permissible maximum frequency of the D/A converters.

Calculation of the filter values can, in fact, continue during horizontal retrace so that when the digital filter is switched on again no disturbing filter build-up occurs.

BRIEF DESCRIPTION OF THE DRAWINGS

FIG. 5 is a diagram useful for explaining operation of the distortion correction system in conjunction with a system for independently programming the lengths of horizontal trace and retrace.

FIG. 8 is a diagram useful for explaining how the first stage interpolator can be switched off during horizontal retrace.

DETAILED DESCRIPTION OF THE PREFERRED EMBODIMENTS

Distortion correction is often based on digital stored correction data (i.e., values or samples) for the horizontal and vertical direction, as well as for the three colors RGB. The distortion correction values are associated with respective points of intersection of a grid defined over the picture screen. These data are used to generate correction currents for driving correction deflection coils by means of digital to analog (D/A) converters and succeeding amplifiers.

It should be noted that the correction current at the end of a horizontal scanning line usually has a completely different value than at the beginning of the line. Accordingly, additional grid points are provided in the non-visible horizontal retrace to more smoothly bring the current its value at the end of the scanning line to the value at the beginning of the next scanning line. In the presently preferred embodiment, 14 grid points are provided in the visible portion of the scanning line and 2 grid points are provided during the retrace portion of the scanning line. Each grid point corresponds to an original distortion correction value.

In order to obtain as faultless a picture as possible, the deflection beam must be corrected at every point in time or at every location on the screen. The information that is required for this purpose has to be obtained from the stored data. In addition, the wave-shape of the correction currents should be as smooth as possible.

Figure 1:
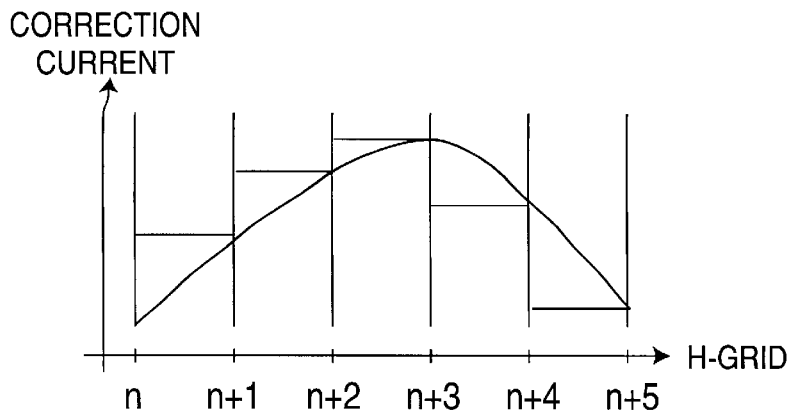
FIG. 1 is a graph useful for explaining the distortion correction signal present at the output of a digital to analog converter and the corresponding output of a passive low pass filter optimized for operation at 3fH and operated at 3fH.

The distortion correction values for vertical distortion correction between the grid points, that is for correcting distortion of the horizontal lines vertically between the grid points, are determined by an interpolation algorithm. In the horizontal direction the desired smooth current can be generated by the external filtering of the correction values sequentially supplied as discrete output values in time by an interpolator, which can be embodied in an integrated circuit. The D/A converter supplies as outputs for the grid points a specific correction value, and maintains this value until the next grid point. From these values the filter subsequently generates the desired smooth current curve. The filter comprises, as a general rule, a passive analog low pass filter often formed as part of the input circuit in a preamplifier or amplifier, the low pass filter receiving the output of the D/A converter, the inductance of the correction coil and the limited bandwidth of the output amplifier. FIG. 1 illustrates the trace of the staircase-like correction signal 10 that is present at the output of a D/A converter and the correction current 12 obtained therefrom with the aid of the filtering.

The time constant of the total system (filter, correction coil, amplifier) must be tuned to the frequency of the data from the D/A converter and thus to the horizontal frequency of the input video signal. Projection television receivers are increasingly designed to be multi-standard devices, which support, for example, different horizontal scanning frequencies and different VGA display standards. Such a multi-standard device must be able to produce properly converged pictures over a range of horizontal deflection frequencies from approximately 15 KHz to approximately 50 KHz.

Figure 2:
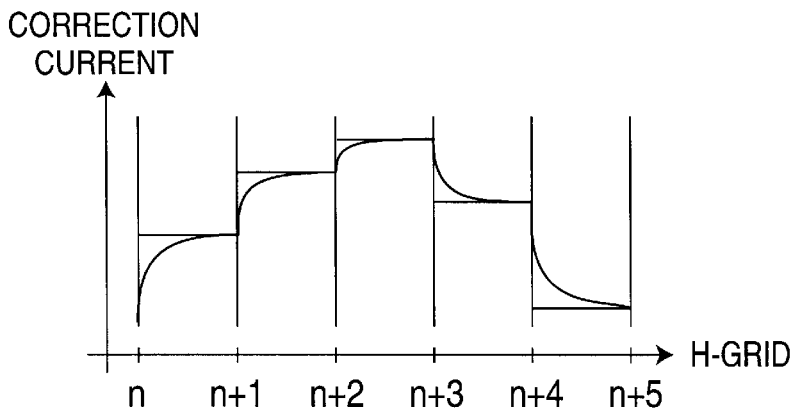
FIG. 2 is a graph useful for explaining the distortion correction signal present at the output of a digital to analog converter and the corresponding output of the same passive low pass filter optimized for operation at 3fH as shown in FIG. 1, but operated at 1fH.

However, if a system optimized to 50 KHz (3.2fH) were to be operated with a 1fH source (that is, a normal television picture with an approximately 16 KHz horizontal frequency), the same staircase-like correction signal 10 shown in FIG. 1 would result in the deflection current 14 shown in FIG. 2. Deflection current is not at all smooth; the slope has numerous discontinuities. This would lead to a disturbing vertical striated pattern on the screen. Conversely, a system optimized to operate at 1fH would not be able to adequately track and smooth the rapid signal changes at relatively high horizontal frequencies, for example 2fH and 3fH.

The poor correction deflection current 14 shown in FIG. 2 can be corrected in accordance with prior art techniques by switching a different low pass filter into the circuit. The different low pass filter would be designed to optimize the overall filter response for a 1fH or 2fH horizontal scanning frequency. However, this technique requires relatively high expenditures and is design-intensive, since as noted, six channels are affected, namely each of RBG for both horizontal and vertical distortion correction. Therefore, it would be necessary to initially design and test, and thereafter, switch between six filters. The switching is complicated by the requirement to implement switching as a function of the range of the supported horizontal frequencies, potentially in several stages, which further increases the complexity and thus the cost of the system. Moreover, such a complex system is likely to be inherently less reliable. In any event, such a system will be more difficult to trouble-shoot and fix should that become necessary.

In accordance with inventive arrangements, the same low pass filter optimized for one of the horizontal scanning frequencies, for example the highest horizontal scanning frequency in the required range, is advantageously used for all horizontal scanning frequencies. Instead, the operation of the digital filter, for example a finite impulse response filter, is advantageously switched on and off and operated in different modes for the different horizontal scanning frequencies in the required range. Advantageously, such digital switching can be very easy to implement as compared to a switching network of low pass filters, particularly if the interpolator is embodied in an integrated circuit. Interpolation filters in accordance with inventive arrangements are preferably implemented in an integrated circuit and can not only be switched on and off, but when switched on, can be flexibly adapted to different operating modes corresponding to different horizontal scanning rates. The different operating modes can advantageously correspond to use of the same digital filter with a different number of input taps, for generating different numbers of interpolated distortion correction values. The inventive arrangements are so effective that the external analog filter can advantageously be implemented as a simple, passive resistive-capacitive (RC) filter.

In accordance with inventive arrangements, a range of horizontal scanning frequencies including 1fH, 2fH and 3fH, and frequencies close to one or more of these values, for example 3.2fH, requires at least three operating modes for the digital filter. Other proposed ranges can require a greater or lesser number of operating modes. In the first operating mode, the digital filter is switched off. The output is only the original distortion correction values (see output 10 in FIG. 1). The external RC filter is optimized for operation at the highest end of the required frequency range, for example 3fH and 3.2fH. At such high horizontal frequencies the external RC filter in connection with the inductor of the correction coil is sufficient as a filter and will produce a smooth distortion deflection current 12 as shown in FIG. 1.

Figure 3:
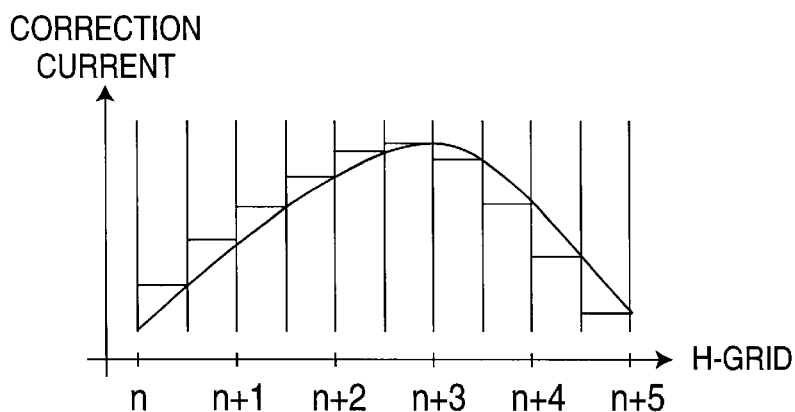
FIG. 3 is a graph useful for explaining the distortion correction signal present at the output of a digital to analog converter and the corresponding output of the same passive low pass filter optimized for operation at 3fH as shown in FIG. 1 but operated at 2fH, and wherein the distortion correction signal includes an additional interpolated correction value between each original correction value.

The digital filter is switched on in the second operating mode. The digital filter is operated as a 3-tap FIR filter, that is, one having three input taps. The inputs to the taps are the original distortion correction values. A 3-tap FIR filter will generate one interpolated distortion correction value spatially between each original distortion correction value. The output of the interpolator is the stair step waveform 16 shown in FIG. 3. This operating mode is intended for a lower horizontal scanning frequency, for example 2fH. In accordance with inventive arrangements, it has been determined that operation at a lower frequency than the optimized frequency, but with a larger number of correction values, both original and interpolated, will also result in the smooth distortion deflection current 18 shown in FIG. 3.

Figure 4:
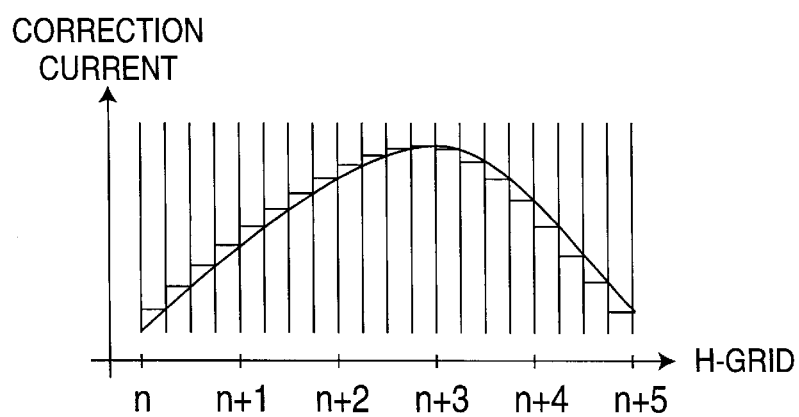
FIG. 4 is a graph useful for explaining the distortion correction signal present at the output of a digital to analog converter and the corresponding output of the same passive low pass filter optimized for operation at 3fH as shown in FIG. 1 but operated at 1fH, and wherein the distortion correction signal includes three additional interpolated correction values between each original correction value.

The digital filter is also switched on in the third operating mode. The digital filter is operated as a 5-tap FIR filter, that is, one having five input taps. The inputs to the taps are the original distortion correction values. A 5-tap FIR filter will generate three interpolated distortion correction values spaced spatially between each original distortion correction value. The output of the interpolator is the stair step waveform 20 shown in FIG. 4. This operating mode is intended for the lower end of the proposed horizontal scanning frequency range, for example 1fH. In accordance with inventive arrangements, it has been determined that operation at a still lower frequency than the optimized frequency, but with a still larger number of correction values, both original and interpolated, will also result in the smooth distortion deflection current 22 shown in FIG. 4.

It will be appreciated that a receiver operating at 2fH and 3fH, for example, might require only the first and second operating modes. A receiver operating at 1fH and 2fH, for example, might require only the second and third operating modes. A receiver operating at 1fH and 3fH, for example, might require only the first and third operating modes.

The digital filter can be advantageously switched off during times other than horizontal trace in the first operating mode, corresponding for example to operation at 3fH. Switching off the digital filter during the horizontal retrace can be particularly useful, for example, if the device operates with high horizontal frequency and very short retrace times. The frequency of the digital filter, and thus also the frequency of the D/A converters, is very high during the return trace under this operating condition. This can lead to exceeding the permissible maximum frequency of the D/A converters. Even if the maximum frequency of the D/A converters is not exceeded, the D/A converters can be a source of a large transient that can disturb proper operation of the digital filter at the beginning of horizontal trace. This is a special concern for a FIR filter, which relies on earlier samples to generate output values. Switching off the filters during the horizontal retrace can advantageously prevent this transient form occurring and can advantageously prevent exceeding the permissible maximum frequency of the D/A converters.

Calculation of the filter values can, in fact, continue during horizontal retrace so that when the digital filter is switched on again no disturbing filter build-up occurs.

During the switching off in the retrace, the data values are switched from the interpolation, as is the case when the digital filter is completely switched off in the first operating mode, and supplied directly to the D/A converters. FIG. 8 shows the output of data at the digital filter output for this mode of operation.

An operating environment including horizontal scanning at frequencies of 3fH or more can require special processing of horizontal scanning to facilitate operation. One such special processing is the capacity to independently program and control the length of time of the horizontal return trace independently of the length of time of the horizontal trace. Two programmable parameters re required. A parameter denoted HGD (horizontal grid distance) determines the number of system clocks for a grid width in the visible portion of the line, 14 grid points in this embodiment. A parameter denoted HRD (horizontal retrace distance) determines the number of system clocks for a grid width in the non-visible portion of the line, 2 grid points in this embodiment.

FIG. 5 shows the conditions at the D/A converter output for all three operating mode. Since HGD and HRD need to be programmable over a wide range independently of one another, and the supporting points generated by the filters should lie symmetrically within a grid time, the filter clock must also be generated corresponding to the particular programming of HGD or HRD. Consequently, the filter operates at two different frequencies during the sweep and during the return race.

Figure 6:
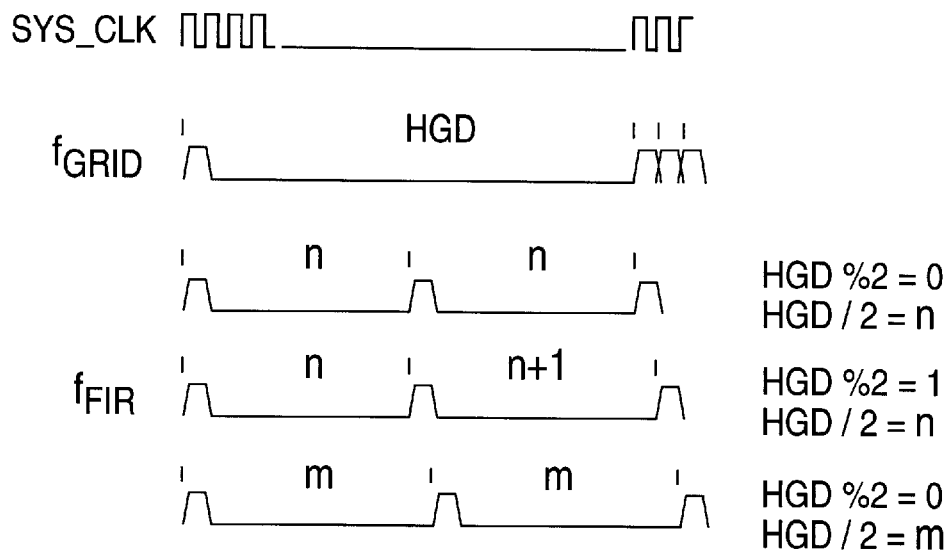
FIGS. 6 and 7 are diagrams useful for explaining the distribution of clock pulses for the selectable outputs of the first interpolating stage.
Figure 7:
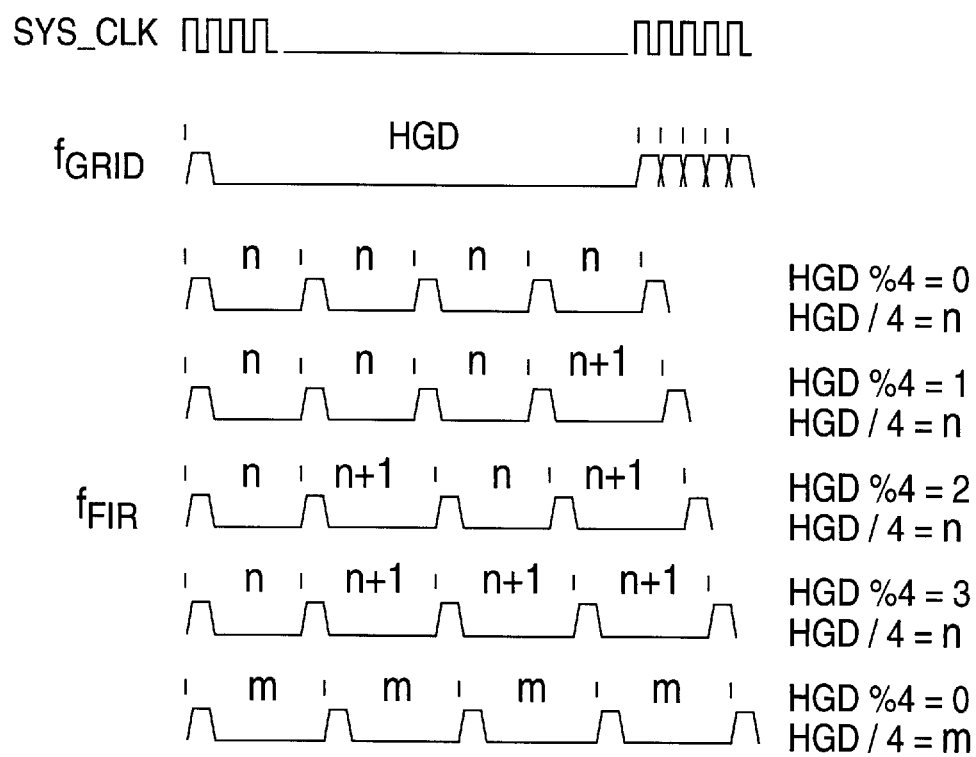

Since HGD and HRD are not always integrally divisible by 2 (second operating mode using a 3-tap filter for 2fH scanning) or 4 (third operating mode using a 5-tap filter for 1fH scanning), the supernumerary clocks must be distributed over the sampling intervals of the filter. This is very simple for the case of second operating mode (2 sampling intervals per grid). In the third operating mode (4 sampling intervals per grid) as uniform as possible a distribution was observed. FIGS. 6 and 7 depict the distribution of the clocks over the sampling intervals for the second and third operating modes respectively. In these Figures, sys_clk is a system clock, for example a system clock in an integrated circuit in which the digital filter is embodied. $f_{GRID}$ is a clock for the grid derived from the system clock. $f_{FIR}$ is a clock for the filter derived also derived form the system clock.

The procedure illustrated by FIGS. 6 and 7 for the horizontal sweep (HGD) is corresponding also applied in the horizontal retrace. To this end only the parameter HGD must be replaced in the Figures by the parameter HRD.

Figure 9:
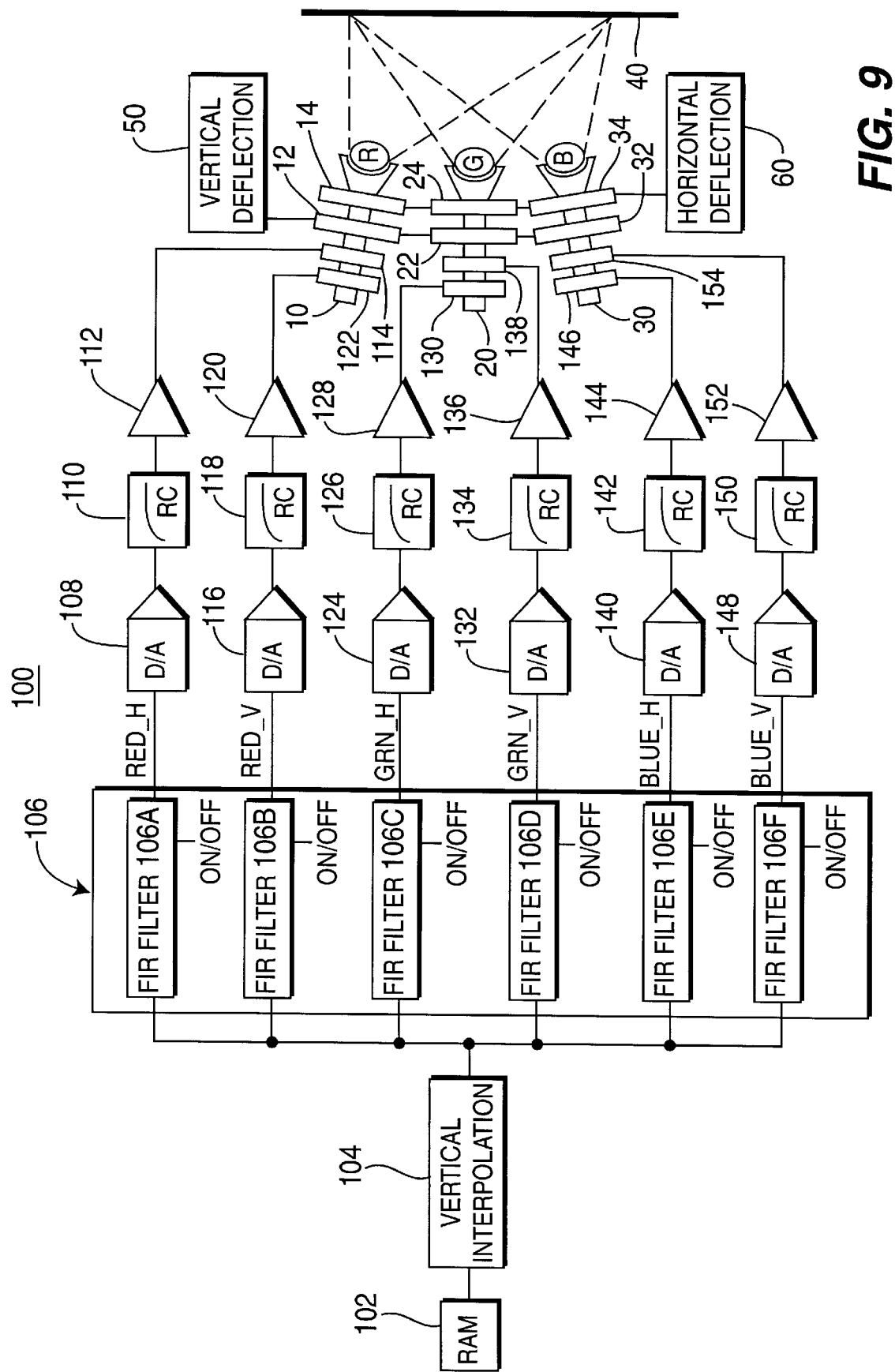
FIG. 9 is a block diagram of a distortion control system in accordance with inventive arrangements.

A complete distortion correction system 100 for a projection television receiver is shown in FIG. 9. The receiver has three projection tubes for each of red (R), green (G) and blue (B) colors. The green tube 20 is axially aligned with a projection screen 10, and accordingly, does not usually require distortion correction. The rasters generated by the red and blue tubes are converged to the raster generated by the green tube. The red tube 10 is provided with a vertical deflection coil 12, a horizontal deflection coil 14, an auxiliary horizontal deflection coil 114 and an auxiliary vertical deflection coil 124. The green tube 20 is provided with a vertical deflection coil 22, a horizontal deflection coil 24, an auxiliary horizontal deflection coil and an auxiliary vertical deflection coil. The auxiliary deflection coils of the green tube are not provided with reference numerals as they play no part in distortion correction in the illustrated embodiment. An auxiliary deflection coil can be used for another purpose, for example scan velocity modulation. The blue tube 30 is provided with a vertical deflection coil 32, a horizontal deflection coil 34, an auxiliary horizontal deflection coil 132 and an auxiliary vertical deflection coil 140. The vertical deflection coils are driven by a vertical deflection signal generated by a vertical deflection circuit 50. The horizontal deflection coils are driven by a horizontal deflection signal generated by a horizontal deflection circuit 60. The auxiliary deflection coils of the red and blue tubes are driven by distortion correction deflection signals.

Generation of the distortion correction deflection signals begins with a set of distortion correction values, referred to herein as original distortion correction values, as distinguished from interpolated distortion correction values generated by the switchable digital filter. The original distortion correction values are stored in a random access memory (RAM). The original distortion correction values represent correction data at the points of a grid defined on the projection screen, as explained above. A vertical interpolation circuit provides sets of distortion correction values for each horizontal line of the grid and vertically interpolated distortion correction values for horizontal lines vertically between the grid points. For purposes of definition, even though the output of the vertical interpolator includes both original distortion correction values and vertically interpolated distortion correction values, all of the values output by the vertical interpolator are deemed to be original distortion correction values for purposes of horizontal interpolation. This is the definition that is applied in the specification and in the claims.

A distortion correction system 100 shown in FIG. 9 comprises a RAM 102 for storing distortion correction values for a grid of points. A vertical interpolator 104 provides original distortion correction values as an output supplied to a switchable digital filter 106. Digital filter 106 comprises a plurality of switchable and programmable FIR filters 106A, 106B, 106C, 106D, 106E and 106F, for providing distortion correction data for red horizontal (RED_H), red vertical (RED_V), green horizontal (GRN_H), green vertical (GRN_V), blue horizontal (BLUE_H) and blue vertical (BLUE_V) respectively. Each of these correction signals can be thought of as being generated by or representing a channel. In a projection television receiver, the correction signals will often be composite signals directed to the correction of different kinds of distortions. The green correction signals will not usually be formulated for convergence correction, but for example will be directed to vertical pincushion correction. The red and blue correction signals will usually be formatted for convergence correction, but these signals can be formulated for correcting other distortions as well.

The output of FIR filter 106A is converted to analog form by D/A converter 108. A passive, low pass resistive-capacitive (RC) filter 108 smoothes the analog signal. The low pass filtered signal is amplified by amplifier 112, which represents a preamplifier or an amplifier or both. The RC filter can be formed as part of an input network associated with a preamplifier. The filtered, smoothed signal drives an auxiliary distortion correction deflection coil 114 of projection tube 10.

The output of FIR filter 106B is converted to analog form by D/A converter 116. A passive, low pass resistive-capacitive (RC) filter 118 smoothes the analog signal. The low pass filtered signal is amplified by amplifier 120, which represents a preamplifier or an amplifier or both. The RC filter can be formed as part of an input network associated with a preamplifier. The filtered, smoothed signal drives an auxiliary distortion correction deflection coil 124 of projection tube 10.

The output of FIR filter 106C is converted to analog form by D/A converter 124. A passive, low pass resistive-capacitive (RC) filter 126 smoothes the analog signal. The low pass filtered signal is amplified by amplifier 128, which represents a preamplifier or an amplifier or both. The RC filter can be formed as part of an input network associated with a preamplifier. The filtered, smoothed signal drives an auxiliary distortion correction deflection coil 130 of projection tube 20.

The output of FIR filter 106D is converted to analog form by D/A converter 132. A passive, low pass resistive-capacitive (RC) filter 134 smoothes the analog signal. The low pass filtered signal is amplified by amplifier 136, which represents a preamplifier or an amplifier or both. The RC filter can be formed as part of an input network associated with a preamplifier. The filtered, smoothed signal drives an auxiliary distortion correction deflection coil 138 of projection tube 20.

The output of FIR filter 106E is converted to analog form by D/A converter 140. A passive, low pass resistive-capacitive (RC) filter 142 smoothes the analog signal. The low pass filtered signal is amplified by amplifier 144, which represents a preamplifier or an amplifier or both. The RC filter can be formed as part of an input network associated with a preamplifier. The filtered, smoothed signal drives an auxiliary distortion correction deflection coil 146 of projection tube 30.

The output of FIR filter 106F is converted to analog form by D/A converter 148. A passive, low pass resistive-capacitive (RC) filter 150 smoothes the analog signal. The low pass filtered signal is amplified by amplifier 152, which represents a preamplifier or an amplifier or both. The RC filter can be formed as part of an input network associated with a preamplifier. The filtered, smoothed signal drives an auxiliary distortion correction deflection coil 154 of projection tube 30.

Figure 10:
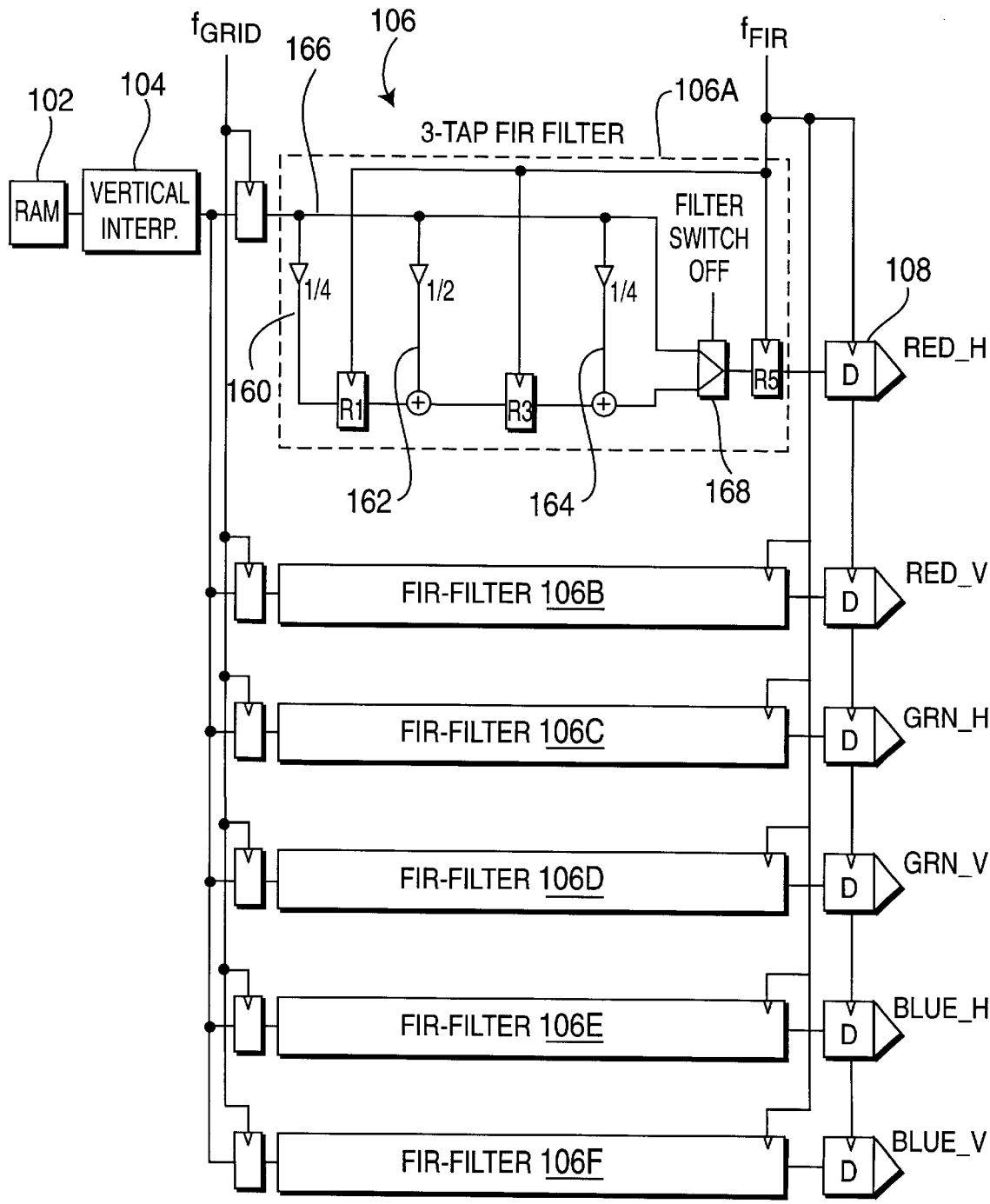
FIG. 10 is a block diagram showing the structure of the FIR filter of FIG. 9 as programmed for three input taps.
Figure 11:
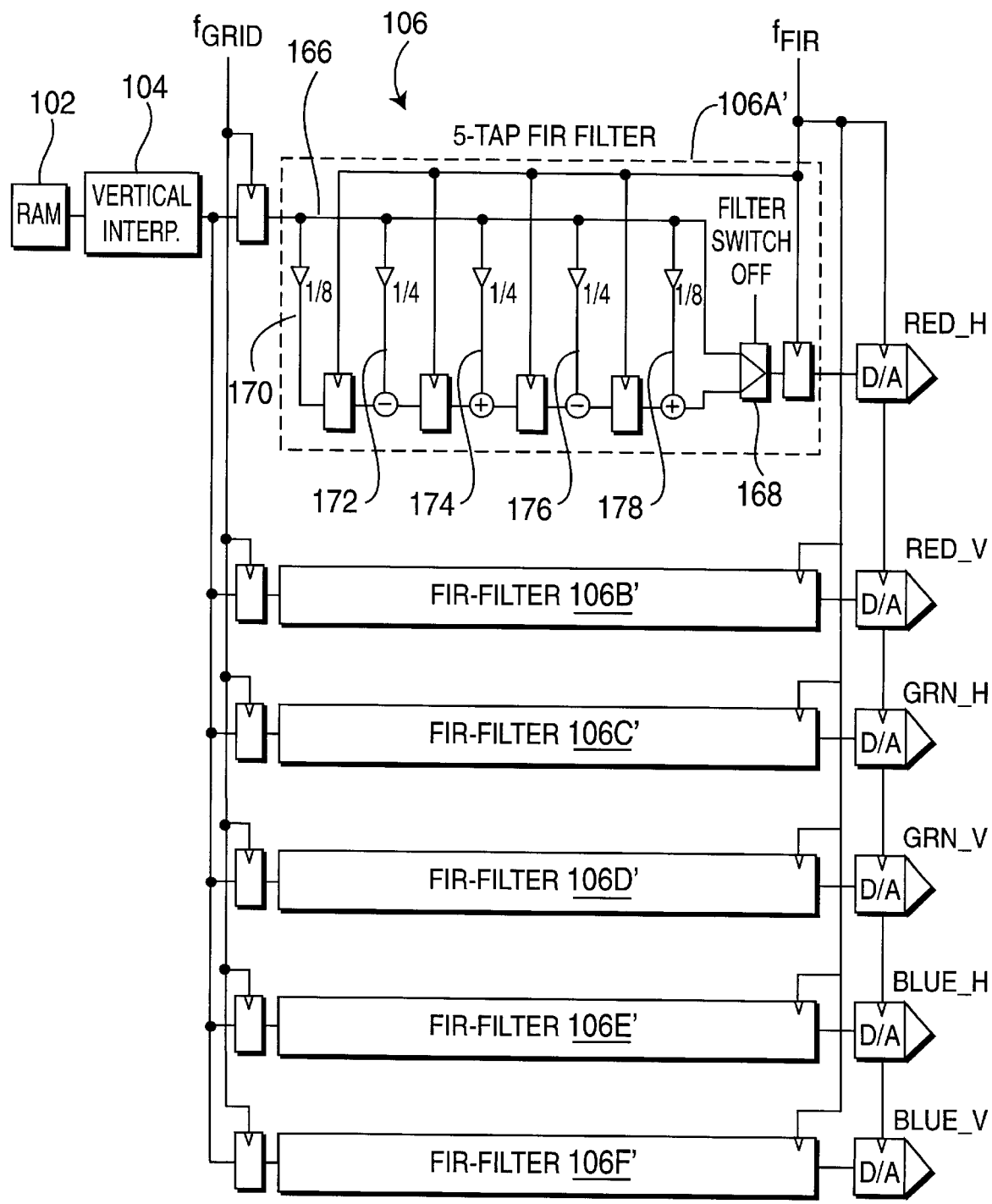
FIG. 11 is a block diagram showing the structure of the FIR filter of FIG. 9 as programmed for five input taps.

In a system adapted to operate in a range of horizontal scanning frequencies, for example from 1fH to 3fH, the low pass RC filters are optimized for operation at 3fH. FIGS. 10 and 11 show the fundamental architecture of the digital FIR filters. Although there needs to be only one programmable digital filter, for example embodied in an integrated circuit, the 3-tap filter arrangement and the 5-tap filter arrangement are shown separately in FIGS. 10 and 11 respectively for purposes of clarity.

With reference to FIG. 10, the digital filter 106 comprises six programmable FIR filters 106A, 106B, 106C, 106D, 106E and 106F. Only the details of FIR filter 106A are shown and identified by reference numerals for purposes of clarity. The other FIR filters have the same configuration. Original distortion correction values are inputs to each of the filters 106A, 106B, 106C, 106D, 106E and 106F.

Filter 106A if a digital FIR filter having 3-taps 160, 162 and 164. The taps are weighted ¼, ½ and ¼ respectively. Original distortion correction values are propagated along path 166. The values form inputs to the taps as they propagate along path 160. The interleaving occurs in switch 168, by means of which the FIR filter can be effectively switched off. In the 3-tap configuration, one interpolated distortion correction value is generated and interleaved between each original distortion correction value. The $f_{GRID}$ clock controls propagation of the original distortion correction values along the path 168. The $f_{FIR}$ clock controls propagation of the interpolated distortion correction values and the interleaved output values of the filter.

The digital filter 100 as shown in FIG. 10 differs from that shown in FIG. 9 in that the FIR filters are programmed as 5-tap FIR filters 106A', 106B', 106C', 106D', 106E' and 106F'. Only the details of FIR filter 106A' are shown and identified by reference numerals for purposes of clarity.

Filter 106A' is a digital FIR filter having 5-taps 170, 172, 174, 176 and 178. The taps are weighted ⅛, ¼, ¼, ¼ and ⅛, respectively. Original distortion correction values are propagated along path 166. The values form inputs to the taps as they propagate along path 160. The interleaving occurs in switch 168, by means of which the FIR filter can be effectively switched off. In the 5-tap configuration, three interpolated distortion correction values are generated and interleaved between each original distortion correction value. The $f_{GRID}$ clock controls propagation of the original distortion correction values along the path 168. The $f_{FIR}$ clock controls propagation of the interpolated distortion correction values and the interleaved output values of the filter.

Generating different numbers of correction values, and in particular different numbers of interpolated correction values, advantageously make it possible to vary the number of samples supplied by the interpolator to maintain a substantially constant sample rate for the correction signal processed by the low pass filter for different horizontal scanning rates. In the presently preferred embodiment, the low pass filter is optimized for the sample rate associated with 3fH horizontal scanning. At the 3fH scanning rate only the original correction values are supplied. No interpolated values are generated. As the scanning rate decreases, more correction values must be generated and supplied in order to maintain the same sample rate through the low pas filter as in 3fH scanning. A scanning rate of 2fH requires one interpolated value between each original value. A scanning rate of 1fH requires three interpolated values between each original value. The low pass filter is thus optimal for all three horizontal scanning rates because the sample rate can be automatically varied.

As a result of the inventive arrangements, each channel of a multiple channel distortion correction system capable of automatically adapting to multiple horizontal scanning frequencies can be provided with a passive low pass filter optimized for only one of the horizontal scanning frequencies. A complex and expensive network of switched filters, each optimized for a different horizontal scanning frequency is unnecessary.

It will be appreciated that all six channels of the distortion correction signals shown in FIG. 9 may not be necessary in all cases for all receivers, depending upon the geometric configuration of the projection tubes and screen in the receiver. It will also be appreciated that the inventive arrangements are applicable to direct view television receivers and monitors, particularly those with large screens or wide deflection angles.

What is claimed is:

1. A distortion correction system, comprising:

a switchable digital filter for interpolating distortion correction values, said distortion correction values together with interpolated distortion correction values being supplied as an output, proper operation of said digital filter being disturbed by transient signals occurring near the beginning of horizontal trace;

a digital to analog converter for converting said supplied output to an analog convergence correction signal, said digital to analog converter having an operating frequency and generating a transient signal during horizontal retrace as said operating frequency increases due to an increased horizontal scanning rate;

a low pass filter coupled for receiving said analog convergence correction signal and generating an analog deflection signal;

an auxiliary deflection coil driven by said analog deflection signal; and, means for switching said digital filter off during said horizontal retrace, whereby said digital filter is protected from disturbance by said transient signal and said digital to analog converter is protected from exceeding a maximum operating frequency.

2. The system of claim 1, wherein said digital filter comprises a finite impulse response filter (FIR).

3. The system of claim 1, wherein said low pass filter comprises a passive analog filter.

4. A method for distortion correction, comprising the steps of:

digitally filtering distortion correction values for generating interpolated distortion correction values, proper operation of said digital filter being disturbed by transient signals occurring near the beginning of horizontal trace;

supplying said distortion correction values together with interpolated distortion correction values as an output;

converting said supplied output to an analog convergence correction signal at an operating frequency, said converting step generating a transient signal during horizontal retrace as said operating frequency increases due to an increased horizontal scanning rate;

low pass filtering said analog convergence correction signal and generating an analog deflection signal;

driving an auxiliary deflection coil with said analog deflection signal; and, inhibiting said digitally filtering step during said horizontal retrace, whereby said digitally filtering step is protected from disturbance by said transient signal and said converting step is protected from exceeding a maximum operating frequency.

5. The method of claim 4, comprising the step of finite impulse response filtering said distortion correction values.

6. The method of claim 4, comprising the step of passively low pass filtering said analog convergence correction signal.

* * * * *